United States Patent
Lee

(10) Patent No.: US 10,054,747 B2
(45) Date of Patent: *Aug. 21, 2018

(54) PUSH-PULL TYPE FIBER OPTIC CONNECTOR ASSEMBLY

(71) Applicant: Alliance Fiber Optic Products, Inc., Sunnyvale, CA (US)

(72) Inventor: Jhih-Ping Lee, New Taipei (TW)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,400

(22) Filed: Jun. 30, 2017

(65) Prior Publication Data

US 2017/0299820 A1 Oct. 19, 2017

Related U.S. Application Data

(63) Continuation of application No. 15/013,010, filed on Feb. 2, 2016, now Pat. No. 9,739,955.

(60) Provisional application No. 62/179,394, filed on May 7, 2015.

(51) Int. Cl.
G02B 6/38 (2006.01)

(52) U.S. Cl.
CPC ......... *G02B 6/3893* (2013.01); *G02B 6/3821* (2013.01); *G02B 6/3869* (2013.01)

(58) Field of Classification Search
CPC .................................................. G02B 6/3893
See application file for complete search history.

(56) References Cited

U.S. PATENT DOCUMENTS

| 5,398,295 | A  | 3/1995  | Chang et al.    |
| 5,475,781 | A  | 12/1995 | Chang et al.    |
| 8,221,007 | B2 | 7/2012  | Peterhans et al.|
| 8,398,039 | B2 | 3/2013  | Murano et al.   |
| 8,465,317 | B2 | 6/2013  | Gniadek et al.  |
| 8,899,845 | B2 | 12/2014 | Gallegos et al. |

(Continued)

OTHER PUBLICATIONS

U.S. Appl. No. 15/140,489, filed Apr. 28, 2016, 23 Pgs.
U.S. Appl. No. 15/202,300, filed Jul. 5, 2016, 33 Pgs.
U.S. Appl. No. 15/140,489, filed Apr. 28, 2016.

*Primary Examiner* — Michelle R Connelly

(57) ABSTRACT

A push-pull type fiber optic connector assembly includes a fiber optic connector connectable to fiber optic adapter and including connector housing, latch having elastic arm extended from top of connector housing for locking connector housing to fiber optic adapter, recessed portion located at bottom side relative to latch, pressure rod extended from recessed portion, fiber ferrule mounted in cable passage inside connector housing, connector sub assembly mounted in connector housing to hold fiber ferrule and fiber optic cable having fiber core inserted through fiber ferrule, and operating handle including sliding cap movably capped on connector housing, push member having push arm forwardly extended from sliding cap, cam located at one side of push arm and inserted into recessed portion of fiber optic connector, and handle shaft extended from sliding cap to pull sliding cap backwards in forcing down wedge-shaped pressure rod for disengaging fiber optic connector from fiber optic adapter.

20 Claims, 12 Drawing Sheets

(56) References Cited

U.S. PATENT DOCUMENTS

| | | |
|---|---|---|
| 9,207,410 B2 | 12/2015 | Lee et al. |
| 9,297,962 B2 | 3/2016 | Lee |
| 9,310,569 B2 | 4/2016 | Lee |
| 2004/0247252 A1 | 12/2004 | Ehrenreich et al. |
| 2008/0056646 A1 | 3/2008 | Terakura |
| 2011/0058773 A1 † | 3/2011 | Peterhans |
| 2013/0195407 A1 | 8/2013 | Imaki et al. |
| 2014/0072263 A1 | 3/2014 | Hung et al. |
| 2014/0169727 A1 | 6/2014 | Veatch et al. |
| 2015/0074967 A1 | 3/2015 | Li et al. |
| 2015/0177463 A1 | 6/2015 | Lee et al. |
| 2015/0212283 A1 | 6/2015 | Jiang et al. |
| 2016/0011383 A1 | 1/2016 | Lee et al. |
| 2016/0033723 A1 | 2/2016 | Liu |
| 2016/0154190 A1* | 6/2016 | Lin .................... G02B 6/3893 385/76 |
| 2016/0238796 A1* | 8/2016 | Nguyen ................ G02B 6/389 |

\* cited by examiner
† cited by third party

PUSH-PULL TYPE FIBER OPTIC CONNECTOR ASSEMBLY

REFERENCE TO RELATED APPLICATIONS

This patent application is a continuation of U.S. patent application Ser. No. 15/013,010, filed 2 Feb. 2016, which claims priority to Provisional Patent Application Ser. No. 62/179,394, filed 7 May 2015, the disclosures of which are incorporated herein by reference in their entirety.

BACKGROUND OF THE INVENTION

1. Field of the Invention

The present invention relates to electrical connector technology and more particularly, to a push-pull fiber optic connector assembly, which comprises a fiber optic connector holding the fiber core of a fiber optic cable in a fiber ferrule inside a connector housing and having a latch for locking the connector housing to a fiber optic adapter, and an operating handle having a sliding cap located at the front side and coupled to the connector housing and a push member for biasing the latch to unlock the connector housing of the fiber optic connector from the fiber optic adapter when the user pulls the handle shaft of the operating handle backwards.

2. Description of the Related Art

With rapid development of modern communications technology and the Internet, data centers and telecommunications providers are trying hard to provide relative equipment having the characteristics of high density, high transmission speed, high capacity and high intelligence. In order to meet the demands for faster data transmission speed, smaller footprint and lower energy consumption, the physical infrastructure of cabling system has been receiving more attention than ever before. Cable and optical fiber transmission systems are two important transmission media in a data center cabling system. When compared with a cable transmission system, an optical fiber transmission system has the advantages of wider bandwidth, faster transmission speed, longer transmission distance, thinner dimension, stronger anti-electromagnetic interference and better confidentiality. Optical fiber transmission system is bound to become the hottest trend in the future.

Further, a variety of fiber optic connectors are commercially available, but SC and LC connectors are the most common types of connectors on the market. An LC duplex connector incorporates two round ceramic ferrules with outer diameters of 1.25 mm and a duplex pitch of 6.25 mm. Two simplex LC connectors can be joined to create one duplex LC connector. Thus, LC type fiber optic connector not only has the advantage of dimensional and alignment precision, but also provides simplex/duplex transmission application flexibility. When connecting multiple fiber optic connectors together, a fiber optic adapter is generally used for connecting the rear connections of the fiber optic connectors. In application, ceramic or copper fiber ferrules are used to protect fiber cores of fiber optic cables, minimizing optical signal transmission loss.

FIGS. 11 and 12 illustrate a conventional LC type fiber optic connector. As illustrated, this design of fiber optic connector A comprises a front housing A1, a latch A11 obliquely backwardly extended from the top wall of the front housing A1, a fiber ferrule A2 mounted in the front housing A1, a compression spring (not shown) mounted around a PTFE tube (not shown) at the rear side of the fiber ferrule A2, a rear housing A3 connected to the rear side of the front housing A1, a fiber optic cable A4 mounted in the rear housing A3 with the fiber core thereof inserted into the fiber ferrule A2, and a press plate A31 obliquely forwardly extended from the top wall of the rear housing A3. In installation, the front housing A1 of the fiber optic connector A is inserted into one connector chamber B2 in an adapter housing B1 of a fiber optic adapter B. When inserting the front housing A1 into one connector chamber B2, the latch A11 is forced by the inner top wall of the connector chamber B2 to curve downwards, and thus, the front housing A1 can be smoothly inserted into the connector chamber B2 to the position where the latch A11 is forced into engagement with a retaining groove B21 in the connector chamber B2 to lock the fiber optic connector A to the fiber optic adapter B. On the contrary, when wishing to remove the fiber optic connector A from the fiber optic adapter B, the user can press the press plate A31 to curve the latch A11 downwards and to further disengage the latch A11 from the retaining groove B21, thereby unlocking fiber optic connector A from the fiber optic adapter B. However, according to this prior art design, the direction to press the latch A11 of the fiber optic connector A and the direction to pull the fiber optic connector A out of the fiber optic adapter B are different. Further, in actual application it is quite inconvenient to access the fingers to the press plate A31 of the fiber optic connector A in a fiber optic connector array, complicating fiber optic connector mounting and dismounting operations.

In order to satisfy the requirements for high density and high efficiency installation, a supplementary tool C can be used for quick removal of the fiber optic connector A from the fiber optic adapter B. The supplementary tool C comprises a handle C1, and a lever C2 perpendicularly extended from one end of the handle C1. In application, attach the rear end of the handle C1 to the fiber optic cable A4, and then insert the lever C2 into the space inside the connector chamber B2 around the latch A11, and then pull the handle C1 backwards to force the lever C2 downwardly against the latch A11 and to further disengage the latch A11 from the retaining groove B21 in the connector chamber B2, unlocking the fiber optic connector A from the fiber optic adapter B and for allowing the fiber optic connector A to be moved backwardly with the supplementary tool C out of the fiber optic adapter B. However, it takes time to remove the fiber optic connector A out of the fiber optic adapter B using the supplementary tool C. This operation procedure is still not very convenient. When mounting or dismounting a large number of fiber optic connectors A, the maintenance and replacement time will be largely increased. Thus, the use of this design of supplementary tool is still not satisfactory.

Therefore, it is desirable to provide a fiber optic connector design that facilitates mounting and dismounting with less effort.

SUMMARY OF THE INVENTION

The present invention has been accomplished under the circumstances in view. It is therefore the main object of the present invention to provide a push-pull type fiber optic connector assembly, which comprises a fiber optic connector and an operating handle. The fiber optic connector is connectable to a fiber optic adapter, comprising a connector housing, a latch having an elastic arm backwardly extended from the top of the connector housing for locking the connector housing to the fiber optic adapter, a recessed portion located at a rear bottom side relative to the latch, a wedge-shaped pressure rod backwardly extended from the recessed portion, a fiber ferrule mounted in a cable passage inside the connector housing, a connector sub assembly mounted in the connector housing to hold the fiber ferrule in place, and a fiber optic cable having a fiber core inserted through the fiber ferrule. The operating handle comprises a sliding cap movably capped on the connector housing, a push member having a push arm forwardly extended from the sliding cap, a cam located at one lateral side of a distal end of the push arm and inserted into the recessed portion of the fiber optic connector, and a handle shaft backwardly extended from the sliding cap and operable to pull the sliding cap backwards in forcing down the wedge-shaped pressure rod for disengaging the fiber optic connector from the fiber optic adapter. Because the operating handle pulling direction is the same as the direction of withdrawing the fiber optic connector out of the fiber optic adapter, this single-action operation is ergonomically in conformity with natural gestures, and thus, the invention achieves convenient single-hand operation with less effort.

According to still another aspect of the present invention, the connector sub assembly comprises a front mating receptacle connected to the connector housing, a rear hollow connection axially backwardly extended from the front mating receptacle and coupled with the outer jacket of the fiber optic cable, and a stop block located at the top side of the front mating receptacle adjacent to the rear hollow connection. The operating handle further comprises an opening located at a front side of the rectangular sliding cap, a receptacle chamber defined in the rectangular sliding cap between two opposite side panels of the rectangular sliding cap in communication with the opening, a position-limit slot located in the top wall of the sliding cap in communication with the receptacle chamber for receiving the stop block of the connector sub assembly. When pulling the operating handle, the stop block of the connector sub assembly is moved in the position-limit slot and then stopped at the front side of the position-limit slot, preventing disconnection of the operating handle from the fiber optic connector to cause function failure or structural damage.

According to still another aspect of the present invention, the operating handle comprises the opening located at a front side of the rectangular sliding cap, the receptacle chamber defined in the rectangular sliding cap between two opposite side panels of the rectangular sliding cap in communication with the opening, and two slits respectively located at the two side panels of the rectangular sliding cap and longitudinally extended to the opening. Subject to the effect of the slits, the opposing top and bottom walls of the sliding cap of the operating handle can be forced vertically outwards by the connector sub assembly for enabling the stop block of the connector sub assembly to be moved into the position-limit slot in the top wall of the sliding cap of the operating handle, simplifying the installation of the push-pull type fiber optic connector assembly, enhancing structural stability, facilitating installation and increasing the production efficiency.

According to still another aspect of the present invention, the wedge-shaped pressure rod of the latch of the fiber optic connector has a width about ½ of the width of the elastic arm. Further, the push arm extends forwardly from the sliding cap in an offset manner relative to the wedge-shaped pressure rod of the latch. The push member of the operating handle further comprises a shoulder forwardly extended from one lateral side of the push arm, and a gap defined between the shoulder and the push arm for receiving the wedge-shaped pressure rod of the latch. The design of the shoulder prevents the wedge-shaped pressure rod of the latch from being pressed accidentally to unlock the latch of the fiber optic connector from the fiber optic adapter.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
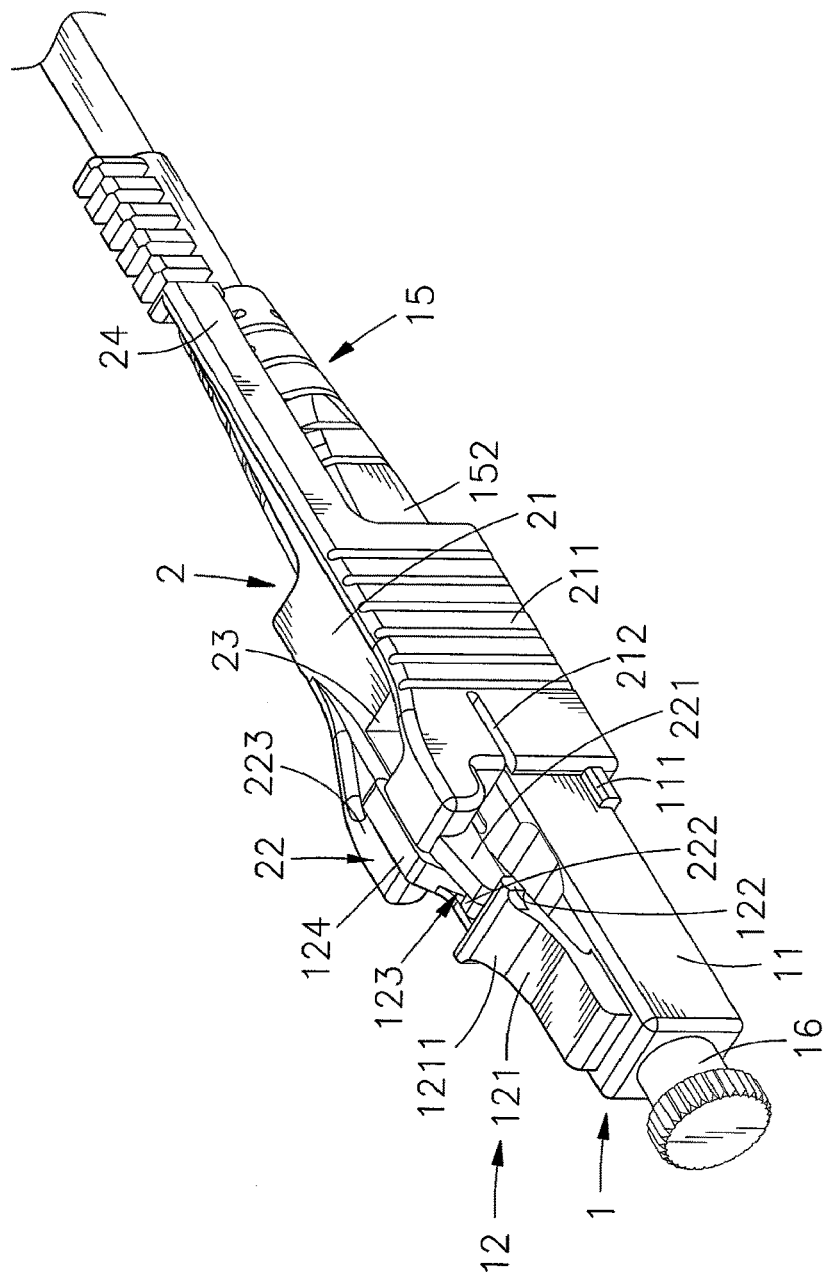
FIG. 1 is an oblique elevational view of a push-pull type fiber optic connector assembly in accordance with the present invention.
Figure 2:
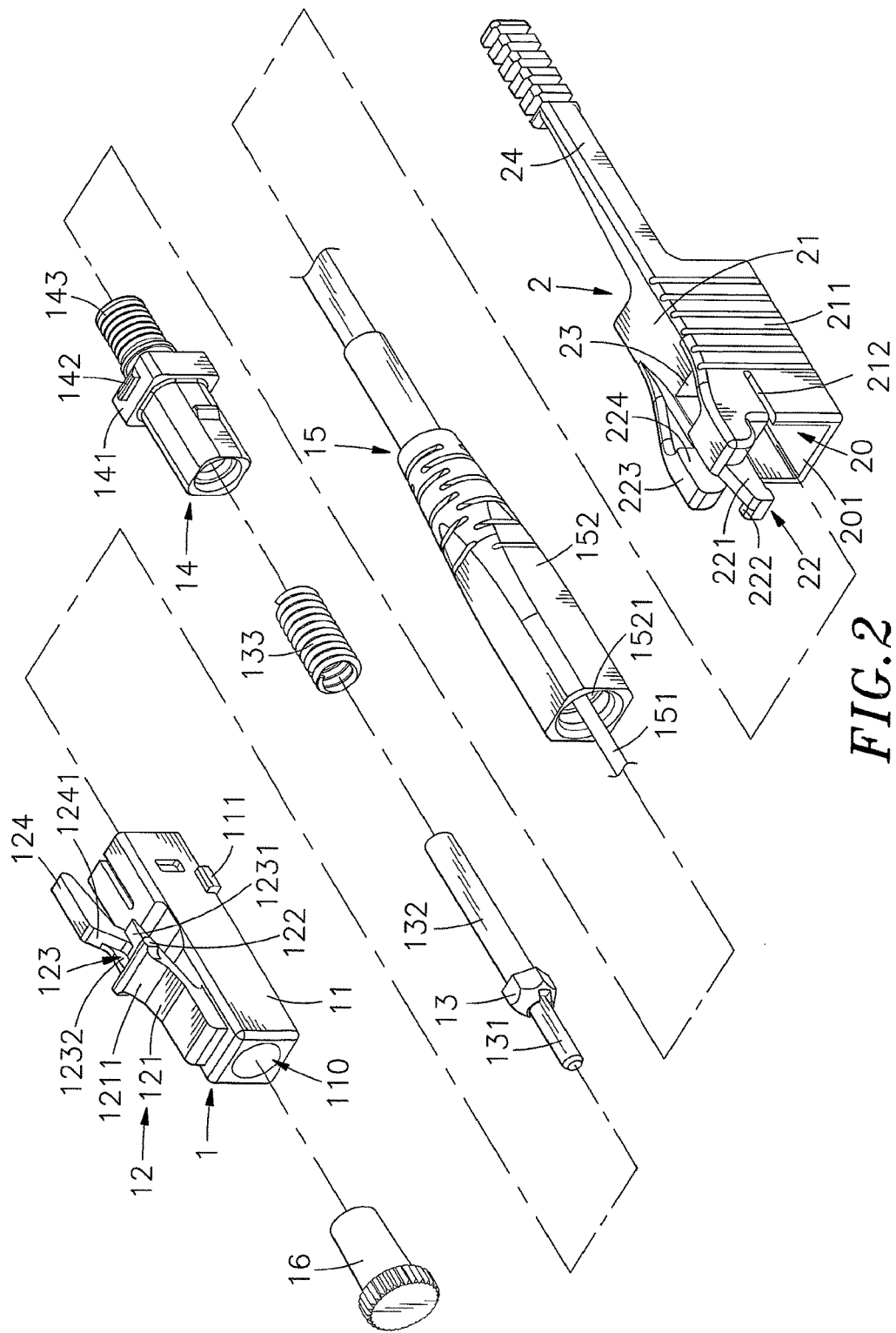
FIG. 2 is an exploded view of the push-pull type fiber optic connector assembly in accordance with the present invention.
Figure 3:
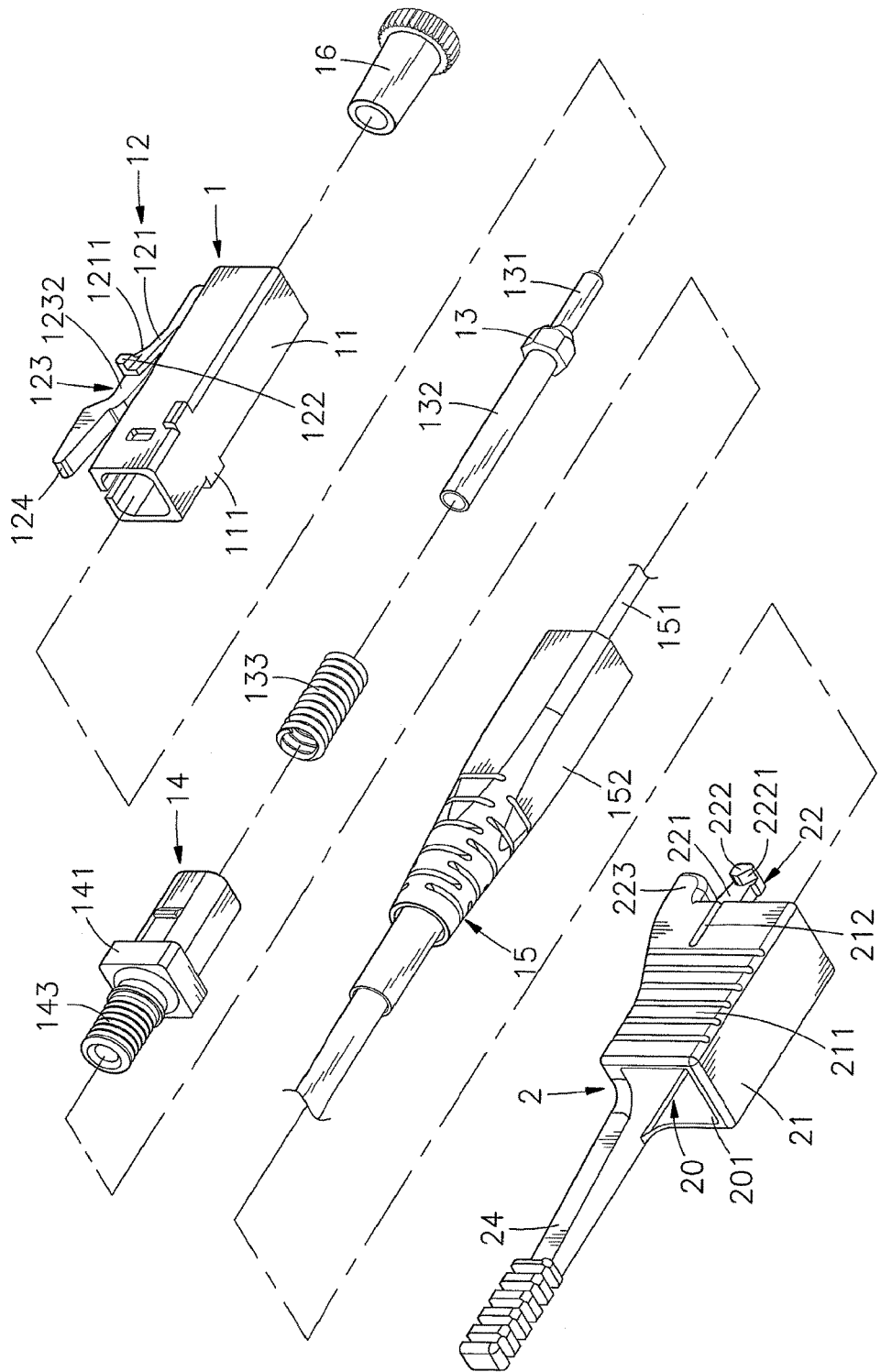
FIG. 3 corresponds to FIG. 2 when viewed from another angle.
Figure 4:
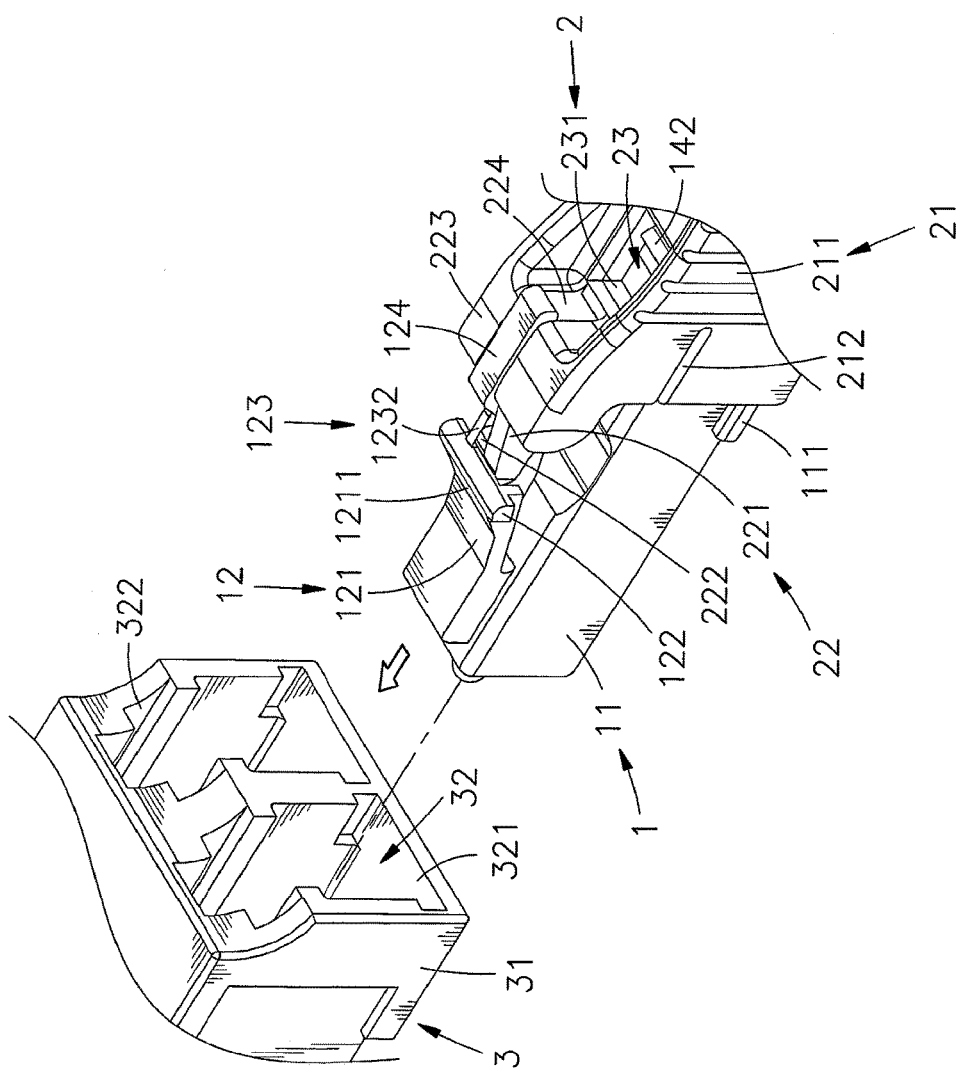
FIG. 4 is a schematic applied view of the present invention before insertion of the push-pull type fiber optic connector assembly into a fiber optic adapter.

Referring to FIGS. 1-4, a push-pull type fiber optic connector assembly in accordance with the present invention is shown. The push-pull type fiber optic connector assembly comprises a fiber optic connector 1 and an operating handle 2.

The fiber optic connector 1 comprises a rectangular connector housing 11, a latch 12 suspending at a top side of the connector housing 11, a fiber ferrule 13, a connector sub assembly 14, and a fiber optic cable 15.

The latch 12 comprises an elastic arm 121 having an upwardly backward sloping top guide surface 1211, two coupling blocks 122 respectively protruded from two opposite lateral sides of the elastic arm 121, a recessed portion 123 located at a rear side of the top guide surface 1211, a wedge-shaped pressure rod 124 of width about ½ of the width of the elastic arm 121 backwardly extended from the recessed portion 123 and suspending above the elevation of the coupling blocks 122, a connection plate 1231 located at a bottom side of the recessed portion 123, a reinforcing rib 1232 perpendicularly located at one lateral side of the connection plate 1231 and connected between the elastic arm 121 and the wedge-shaped pressure rod 124, and a pushing surface 1241 located at a front side of the wedge-shaped pressure rod 124 adjacent to the reinforcing rib 1232 and sloping downwardly forwardly toward the recessed portion 123.

Further, the connector housing 11 of the fiber optic connector 1 comprises a cable passage 110 extending through opposite front and rear ends thereof for accommodating the fiber ferrule 13, the connector sub assembly 14 and the fiber optic cable 15, and two locating blocks 111 respectively located at two opposing rear bottom sides thereof. The fiber ferrule 13 comprises a front ceramic tube 131 and a rear extension tube 132 axially aligned in line. The connector sub assembly 14 comprises a front mating receptacle 141, a rear hollow connection 143 axially backwardly extended from the front mating receptacle 141, and a stop block 142 located at a top side of the front mating receptacle 141 adjacent to the rear hollow connection 143. The extension tube 132 is inserted into the front mating receptacle 141 of the connector sub assembly 14. Further, a spring member 133 is mounted inside the front mating receptacle 141 of the connector sub assembly 14 around the extension tube 132 to support the fiber ferrule 13 in the connector sub assembly 14. The front mating receptacle 141 of the connector sub assembly 14 is fastened to the rear end of the connector housing 11 to keep the rear hollow connection 143 in communication with the cable passage 110 of the connector housing 11. The fiber optic cable 15 comprises a fiber core 151 inserted through the rear extension tube B2 and front ceramic tube 131 of the support the fiber ferrule 13 in the connector sub assembly 14 to the outside of the fiber optic connector 1, an outer jacket 152 surrounding the fiber core 151, and a press-fit hole 1521 located at a front side of the outer jacket 152 around the fiber core 151 and press-fitted onto the rear hollow connection 143 of the connector sub assembly 14. Further, a dust cap 16 is capped on the front end of the cable passage 110 of the connector housing 11.

The operating handle 2 comprises a rectangular sliding cap 21 movably capped on the connector housing 11 of the fiber optic connector 1, an opening 201 located at a front side of the rectangular sliding cap 21, a receptacle chamber 20 defined in the rectangular sliding cap 21 between two opposite side panels 211 of the rectangular sliding cap 21 in communication with the opening 201, two slits 212 respectively located at the two side panels 211 and longitudinally extended to the opening 201. A push member 22 comprises a push arm 221 forwardly extended from a top side of the sliding cap 21 in an offset manner relative to the wedge-shaped pressure rod 124 of the latch 12, and a cam 222 located at one lateral side of a distal end of the push arm 221 and inserted into the recessed portion 123 of the latch 12, The cam 222 has a cut face 2221 abutted against the pushing surface 1241.

The aforesaid push member 22 further comprises a shoulder 223 forwardly extended from one lateral side of the push arm 221, and a gap 224 defined between the shoulder 223 and the push arm 221 for receiving the wedge-shaped pressure rod 124 of the latch 12. When attaching the sliding cap 21 of the operating handle 2 onto the connector sub assembly 14 of the fiber optic connector 1, the stop block 142 of the connector sub assembly 14 is forced through the opening 201 into the receptacle chamber 20 in the sliding cap 21. At this time, subject to the effect of the slits 212, the opposing top and bottom walls of the sliding cap 21 of the operating handle 2 are forced vertically outwards by the connector sub assembly 14 for enabling the stop block 142 of the connector sub assembly 14 to be moved into a position-limit slot 23 in the top wall of the sliding cap 21 of the operating handle 2. The operating handle 2 further comprises a stop edge 231 located at a front side of the position-limit slot 23 for stopping against the stop block 142 of the connector sub assembly 14, and a handle shaft 24 horizontally backwardly extended from a rear side of the sliding cap 21.

Figure 5:
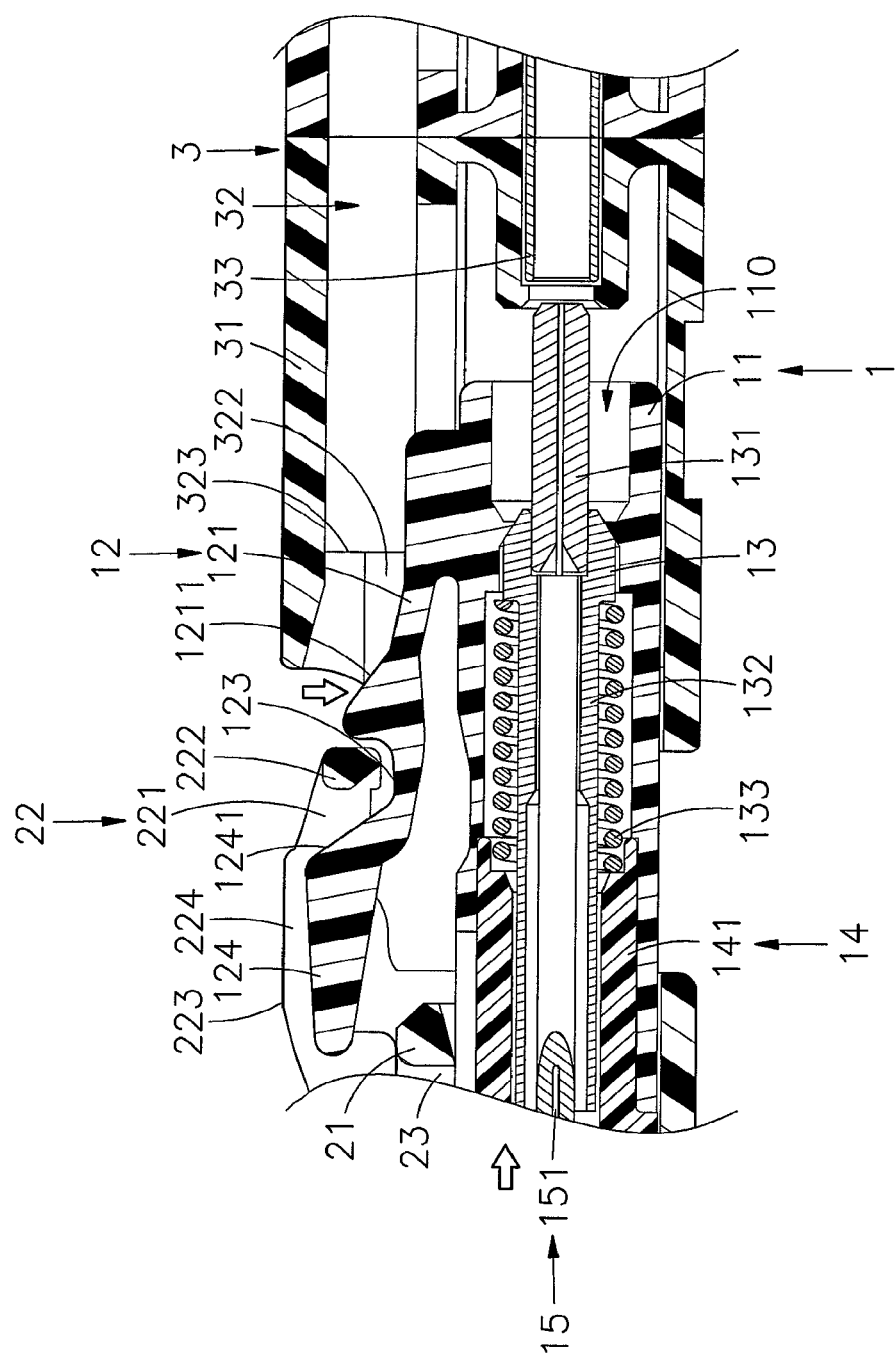
FIG. 5 is a sectional applied view of the present invention, illustrating insertion of the push-pull type fiber optic connector assembly into the selected connector chamber of the fiber optic adapter (I).
Figure 6:
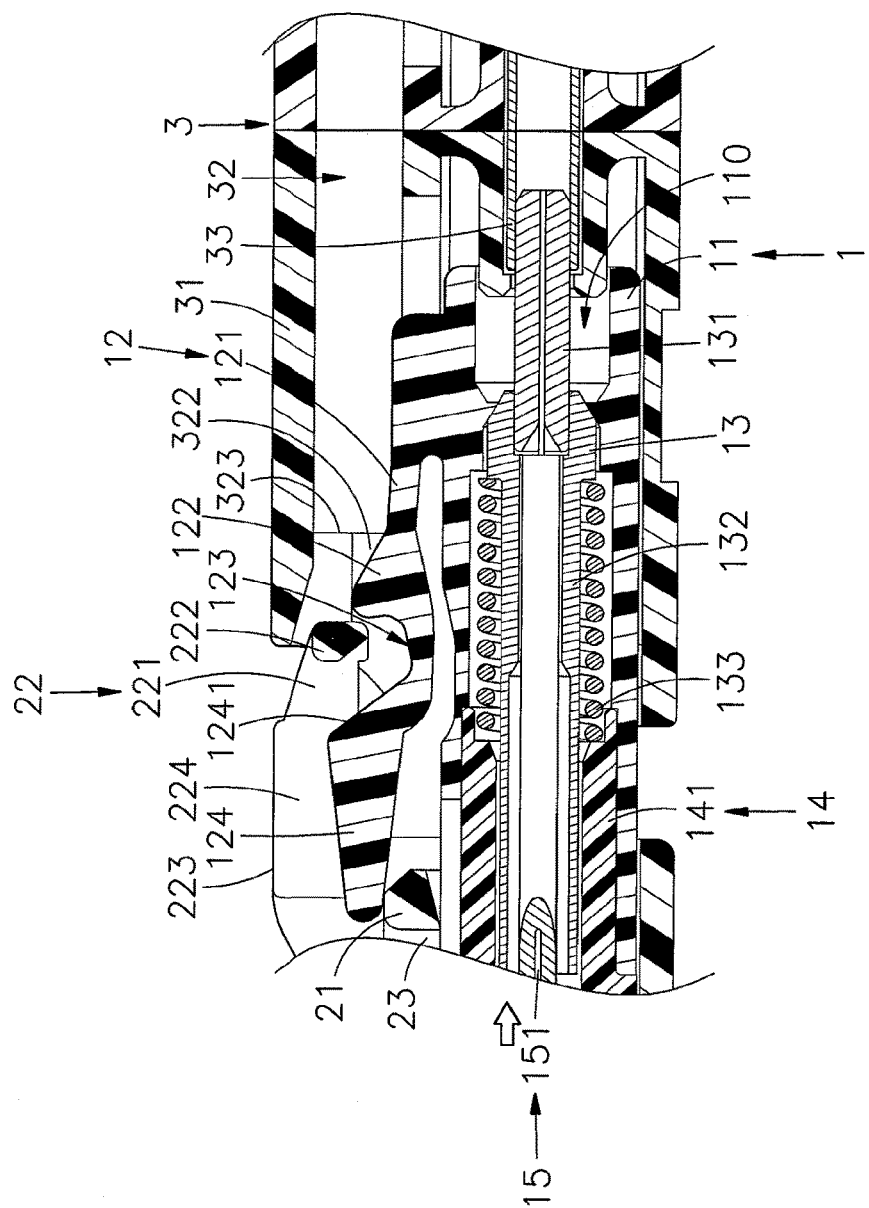
FIG. 6 is a sectional applied view of the present invention, illustrating insertion of the push-pull type fiber optic connector assembly into the selected connector chamber of the fiber optic adapter (II).
Figure 7:
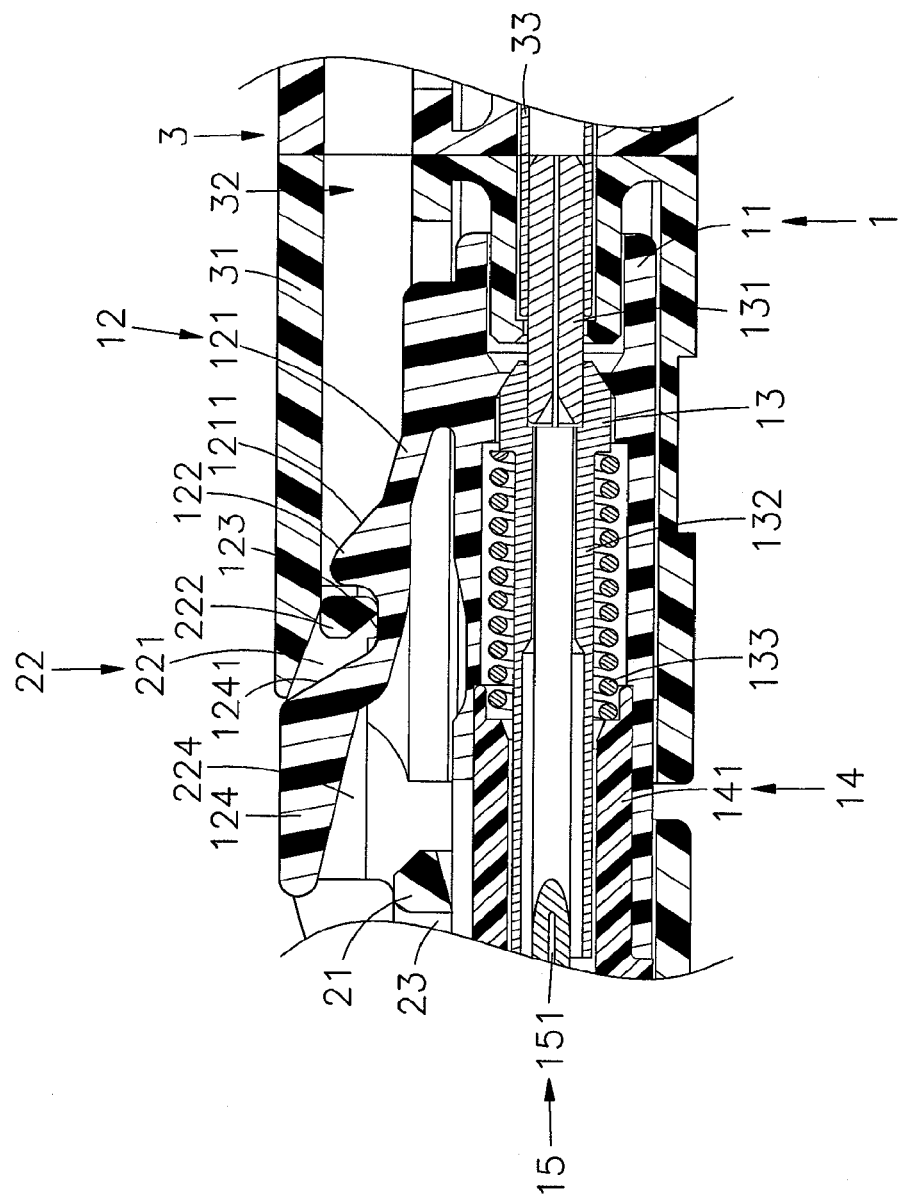
FIG. 7 corresponds to FIG. 6, illustrating the fiber optic connector of the push-pull type fiber optic connector assembly locked to the fiber optic adapter.

Referring to FIGS. 5-7, the push-pull type fiber optic connector assembly is adapted for connection to a fiber optic adapter 3. The fiber optic adapter 3 comprises an adapter housing 31, at least one pair of connector chambers 32 defined in the adapter housing 31, an insertion slot 321 defined in one end of each connector chamber 32, two horizontal sliding grooves 322 bilaterally and longitudinally located at a top side in each connector chamber 32 and extended to the associating insertion slot 321, a stop wall 323 vertically disposed at an inner end of each horizontal sliding grooves 322, and a fiber holder 33 transversely extended through two opposing lateral walls thereof across one respective pair of connector chambers 32. There are many different structural designs for the fiber optic adapter 3, such as simplex, duplex or quad style with a transverse mounting slot, seat or other member extended across each pair of connector chambers 32 for the mounting of one respective fiber holder 33.

When mounting the push-pull type fiber optic connector assembly in one connector chamber 32 of the fiber optic adapter 3, aim the connector housing 11 of the fiber optic connector 1 at the selected connector chamber 32 and then push the sliding cap 21 of the operating handle 2 forwardly relative to the fiber optic connector 1 to stop the front edge of the sliding cap 21 around the opening 201 at the locating blocks 111 of the fiber optic connector 1 and to further move the connector housing 11 of the fiber optic connector 1 into the selected connector chamber 32 of the fiber optic adapter 3. At this time, the elastic arm 121 of the latch 12 of the fiber optic connector 1 is abutted against an inner top wall of the insertion slot 321 of the selected connector chamber 32 of the fiber optic adapter 3. When continuously moving the fiber optic connector 1 toward the inside of the selected connector chamber 32 of the fiber optic adapter 3, the top guide surface 1211 is forced by the inner top wall of the insertion slot 321 of the selected connector chamber 32 of the fiber optic adapter 3, causing the elastic arm 121 to elastically curve downwards toward the top wall of the connector housing 11 of the fiber optic connector 1 for allowing movement of the two coupling blocks 122 into the respective horizontal sliding grooves 322 in the respective connector chamber 32. After the fiber optic connector 1 is set in position in the selected connector chamber 32 of the fiber optic adapter 3, the elastic material property of the latch 12 immediately returns the latch 12 to its former shape, forcing the coupling blocks 122 into engagement with the respective stop walls 323, achieving the effects of low insertion force and high anti-pull strength. Further, subject to the guidance of the fiber ferrule 13, the fiber core 151 of the fiber optic cable 15 is smoothly guided into the fiber holder 33 to achieve accurate connection for optimal optical signal transmission with minimized insertion loss and reflective loss.

Figure 8:
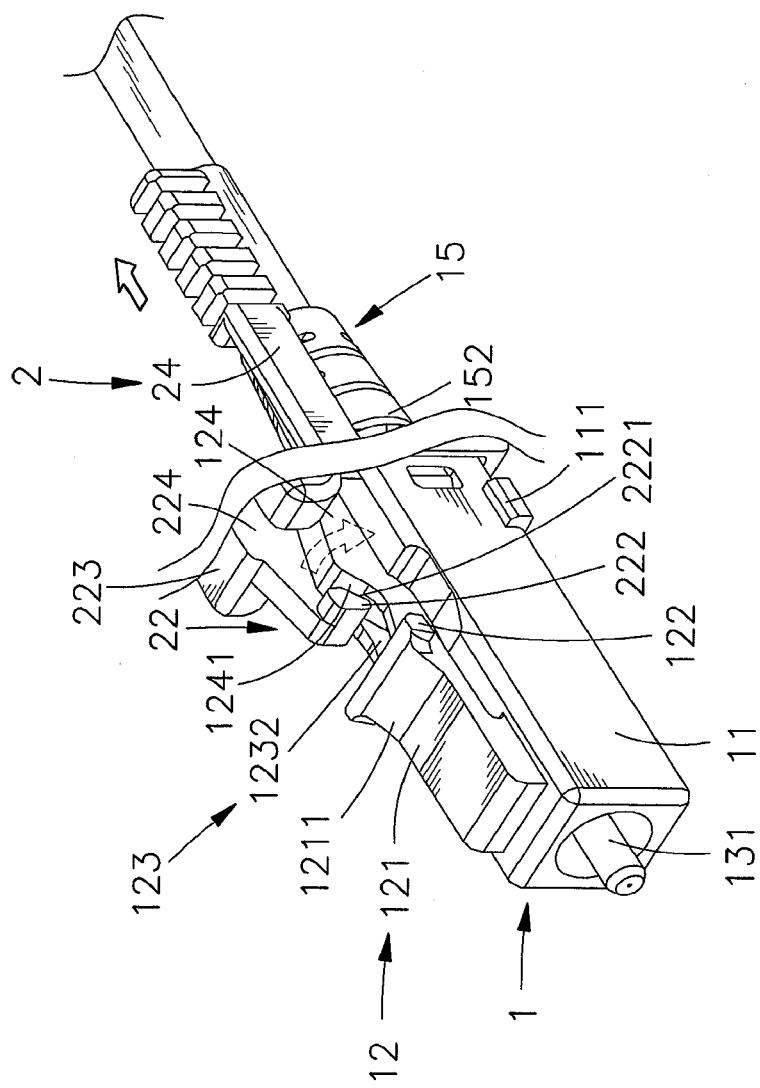
FIG. 8 is a schematic elevational view of the present invention, illustrating a withdrawing operation of the push-pull type fiber optic connector assembly from the fiber optic adapter.
Figure 9:
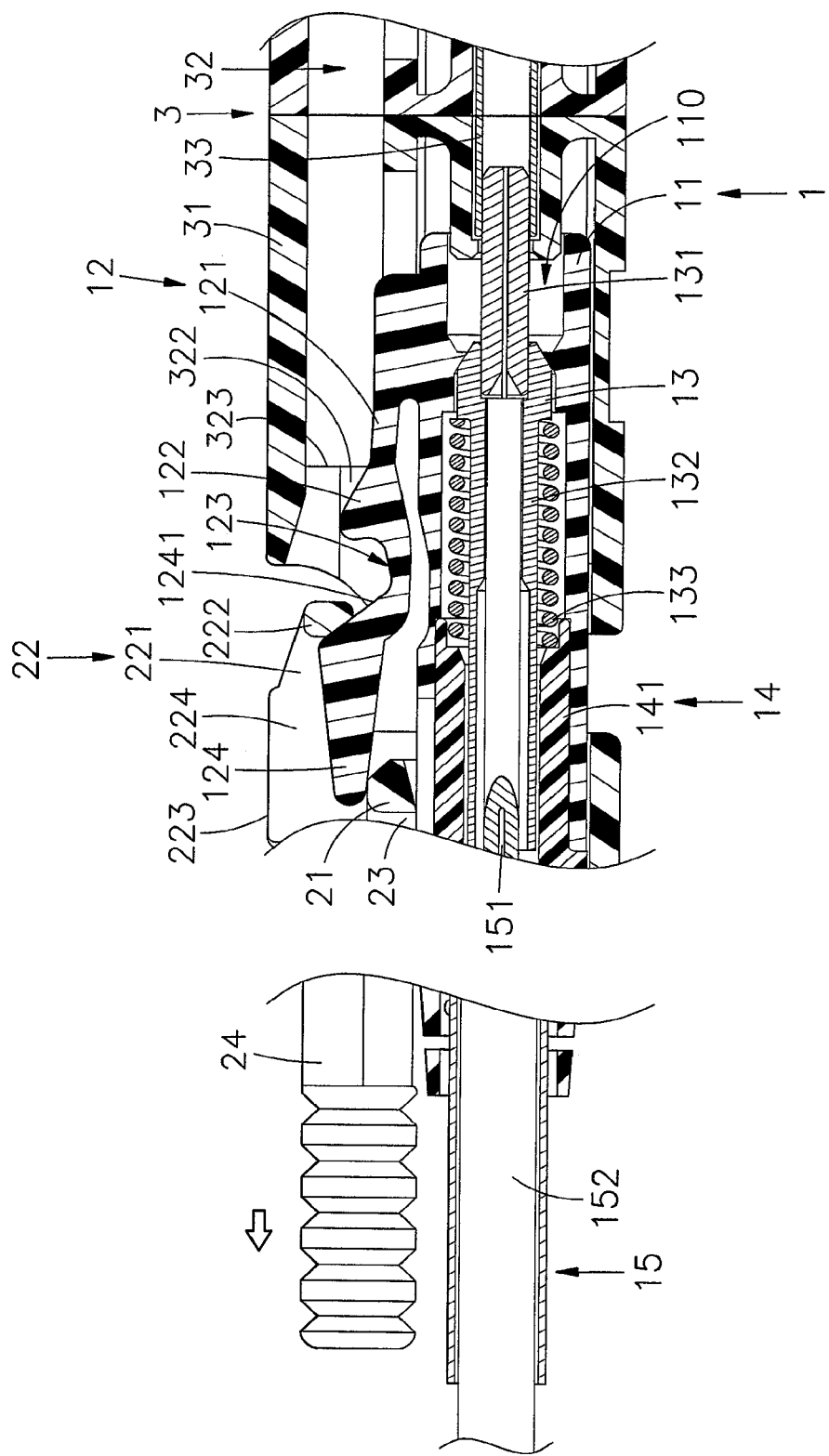
FIG. 9 is a schematic sectional view of the present invention, illustrating withdrawal of the push-pull type fiber optic connector assembly from the fiber optic adapter.
Figure 10:
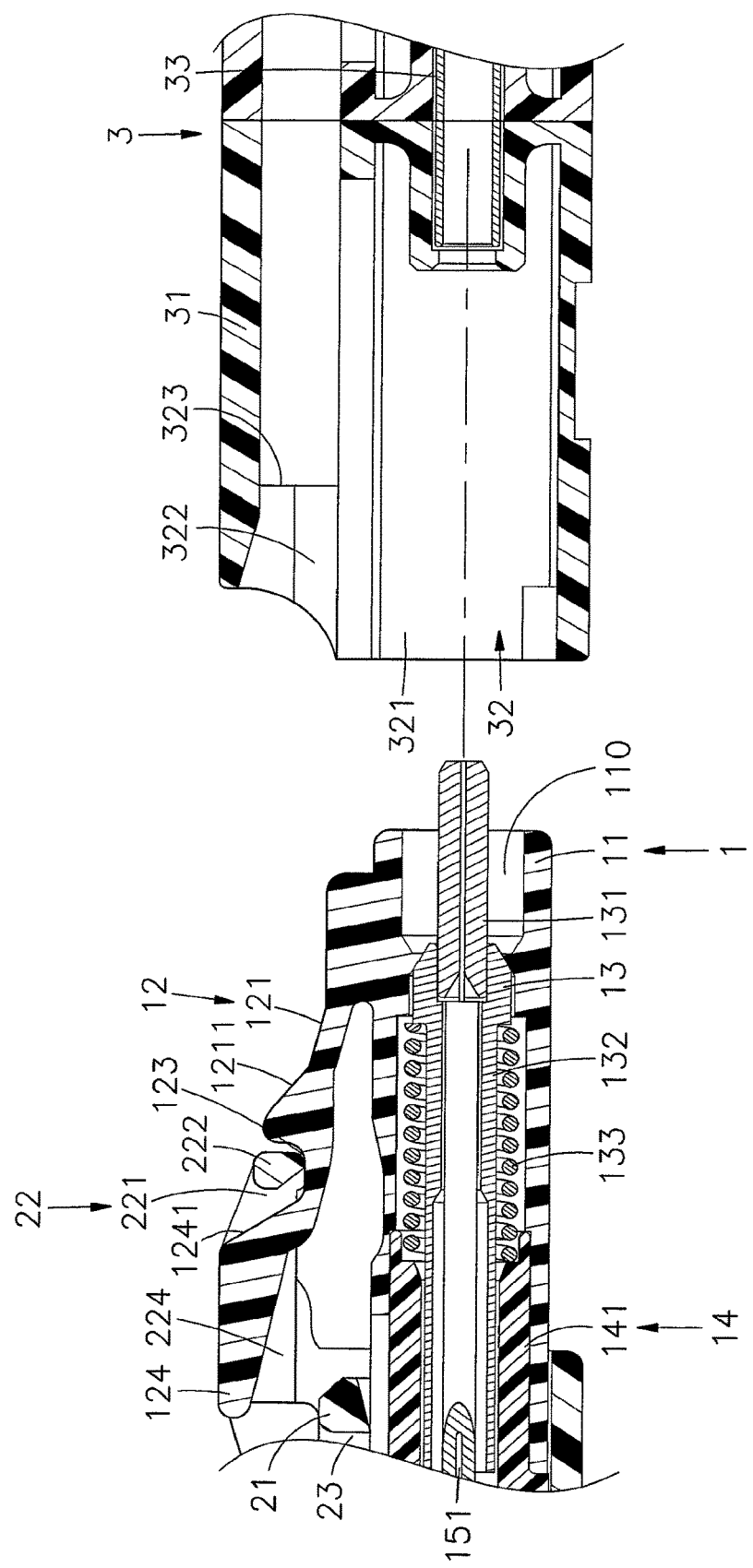
FIG. 10 is a schematic sectional view illustrating the push-pull type fiber optic connector assembly moved out of the fiber optic adapter.
Figure 11:
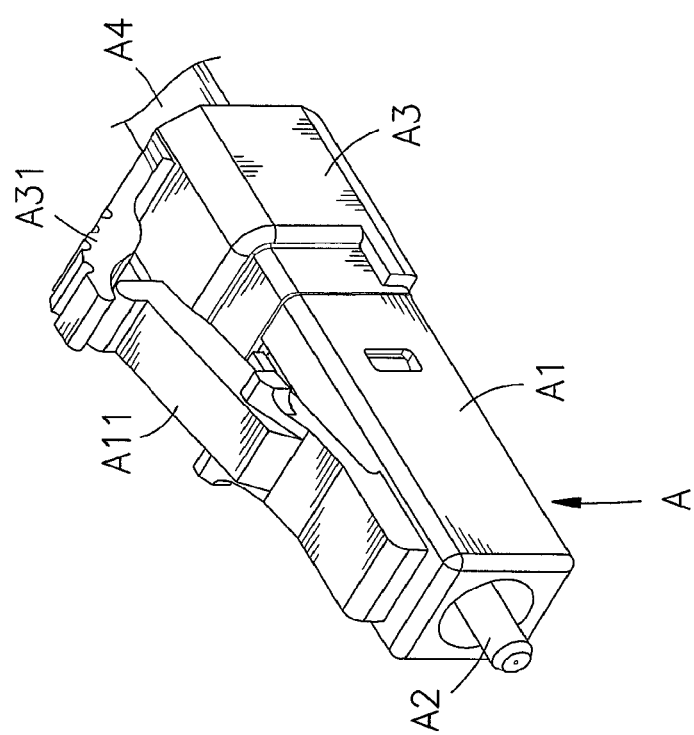
FIG. 11 is an elevational view of a fiber optic connector according to the prior art.
Figure 12:
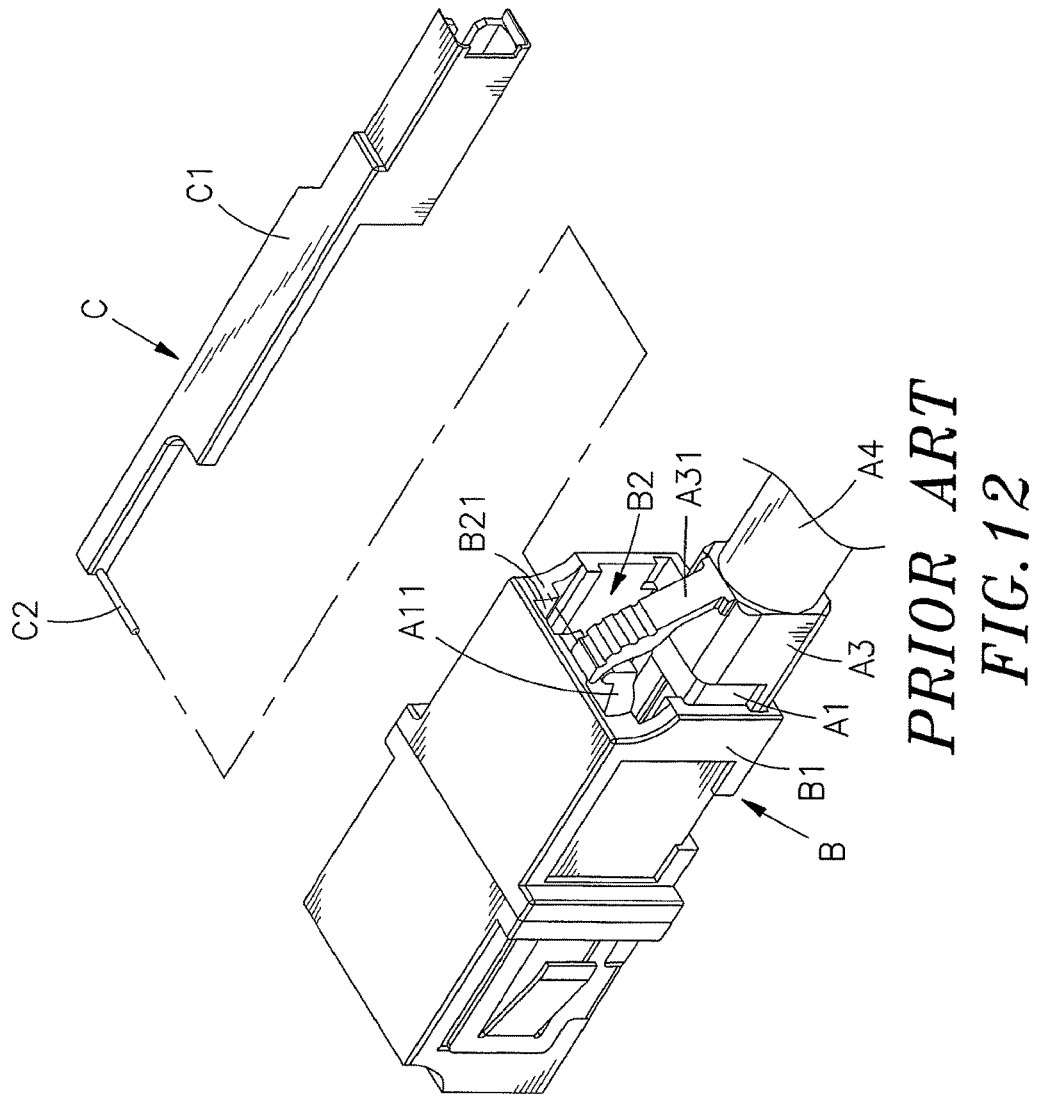
FIG. 12 is a schematic applied view of the prior art fiber optic connector.

Referring to FIGS. 8-10, when going to disconnect the fiber optic connector 1 from the fiber optic adapter 3, operate the handle shaft 24 of the operating handle 2 to move the sliding cap 21 backwards relative to the housing 11, forcing the cam 222 of the push member 22 against the wedge-shaped pressure rod 124 of the latch 12. At this time, the pushing surface 1241 at the wedge-shaped pressure rod 124 is forced against the cut face 2221, causing the elastic arm 121 to curve downwards and to further disengage the coupling blocks 122 from the respective stop walls 323 in the respective connector chamber 32, and thus, the fiber optic connector 1 of the push-pull type fiber optic connector assembly is unlocked from the fiber optic adapter 3 and directly movable out of the fiber optic adapter 3. After removal of the fiber optic connector 1 of the push-pull type fiber optic connector assembly out of the fiber optic adapter 3, the latch 12 immediately returns to its former shape subject to the effect of its elastic material property. Because the pulling direction of the operating handle 2 is the same as the direction of withdrawing the fiber optic connector 1 out of the fiber optic adapter 3, this single-action operation is ergonomically in conformity with natural gestures, and thus, the invention achieves convenient single-hand operation with less effort.

Further, before pulling the operating handle 2, the wedge-shaped pressure rod 124 of the latch 12 is movably suspending in the gap 224 between the shoulder 223 and push arm 221 of the operating handle 2 and, the shoulder 223 is disposed slightly above the elevation of the wedge-shaped pressure rod 124 of the latch 12. The design of the shoulder 223 prevents the wedge-shaped pressure rod 124 of the latch 12 from being pressed accidentally to unlock the latch 12 of the fiber optic connector 1 from the fiber optic adapter 3. Further, during the operation of pulling the operating handle 2 backwards, the stop block 142 of the connector sub assembly 14 will be moved in the position-limit slot 23 and then stopped at the stop edge 231, preventing disconnection of the operating handle 2 from the fiber optic connector 1 to cause function failure or structural damage.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A fiber optic connector assembly comprising:
   a connector housing defining a cable passage extending through opposing front and rear ends of the connector housing;
   a latch comprising an elastic arm extending upwardly from a top surface of the connector housing in a rearward direction from the front end of the connector housing and a pressure rod extending in a rearward direction away from a rear side of the elastic arm; and
   a handle movably coupled to the connector housing, the handle comprising a push arm,
   a cam, and a handle shaft, wherein:
   the pressure rod comprises a pushing surface disposed at a front side of the pressure rod;
   the push arm is laterally offset relative to the pressure rod of the latch;
   the cam is located at a lateral side of the push arm and configured to contact the pushing surface of the pressure rod; and
   the handle shaft extends backwardly in an opposite direction from the push arm and is configured to pull the handle backwards to engage the pressure rod.

2. The fiber optic connector assembly of claim 1 wherein the elastic arm comprises a pair of coupling blocks respectively protruded from opposite lateral sides of the elastic arm configured to engage respective stop walls in the connector chamber of the fiber optic adapter.

3. The fiber optic connector assembly of claim 1 wherein:
   the elastic arm and the pressure rod define a recessed portion disposed between the elastic arm and the pressure rod; and
   the elastic arm comprises a top guide surface sloping downwardly forward of the recessed portion.

4. The fiber optic connector assembly of claim 1 wherein:
   the elastic arm and the pressure rod define a recessed portion disposed between the elastic arm and the pressure rod: and
   the connector housing comprises a connector plate coupled to the rear side of the elastic arm and the pressure rod;
   the connector plate is disposed at a bottom portion of the recessed portion coupling the pressure rod to the elastic arm; and
   the pressure rod, the connector plate, and the elastic arm define the recessed portion.

5. The fiber optic connector assembly of claim 4 wherein a reinforcing rib is disposed at a lateral side of the connector plate at a bottom side of the recessed portion and is coupled to the elastic arm and the pressure rod.

6. The fiber optic connector assembly of claim 1 wherein: the handle comprises a sliding cap movably coupled to the connector housing; the push arm forwardly extends from the sliding cap; and the handle shaft backwardly extends from the sliding cap.

7. The fiber optic connector assembly of claim 6 wherein the sliding cap comprises a pair of opposing side panels defining a receptacle chamber between the pair of opposing side panels.

8. The fiber optic connector assembly of claim 7 wherein the sliding cap comprises a pair of slits respectively disposed at each of the opposing side panels of the sliding cap and longitudinally extending to an opening of the receptacle channel.

9. The fiber optic connector assembly of claim 7 wherein the assembly further comprises:
   a fiber ferrule accommodated in the cable passage of the connector housing; and a connector sub-assembly mounted in the connector housing and supporting the fiber ferrule.

10. The fiber optic connector assembly of claim 9 wherein the sliding cap further comprises a position-limit slot disposed in a wall of the sliding cap in communication with the receptacle chamber for receiving a stop block of the connector sub-assembly.

11. The fiber optic connector assembly of claim 10 wherein:
   the connector subassembly comprises a front mating receptacle and a rear hollow connection axially backwardly extending from the front mating receptacle; and
   the stop block extends from a side of the front mating receptacle adjacent to the rear hollow connection.

12. The fiber optic connector assembly of claim 9 wherein:
   the assembly further comprises a fiber optic cable disposed within the cable passage; and the fiber optic cable comprises a fiber core inserted through the fiber ferrule.

13. The fiber optic connector assembly of claim 9 wherein:

the fiber ferrule comprises a front ceramic tube and a rear extension tube axially extended from the front ceramic tube and inserted into the connector sub-assembly; and a spring member is mounted inside the connector sub-assembly around the extension tube to support the fiber ferrule in the connector sub-assembly.

14. The fiber optic connector assembly of claim 6 wherein:

the push arm of the handle extends forwardly from the sliding cap of the handle offset relative to the pressure rod;

the handle further comprises a forwardly extending shoulder; and the push arm and the shoulder define a gap configured to receive the pressure rod.

15. The fiber optic connector assembly of claim 14 wherein the shoulder extends above an elevation of the pressure rod.

16. The fiber optic connector assembly of claim 6 wherein the connector housing further comprises a pair of locating blocks respectively disposed at two opposing rear bottom sides of the connector housing configured to stop against a front edge of the sliding cap of the handle.

17. The fiber optic connector assembly of claim 1 wherein the cam comprises a cut face abutting the pushing surface of the pressure rod.

18. The fiber optic connector assembly of claim 1, further comprising:

a fiber ferrule accommodated in the cable passage of the connector housing; and a connector sub-assembly mounted in the connector housing and supporting the fiber ferrule.

19. The fiber optic connector assembly of claim 18, further comprising a fiber optic cable disposed within the cable passage, wherein the fiber optic cable comprises a fiber core inserted through the fiber ferrule.

20. A method of disconnecting a fiber optic connector from a fiber optic to a fiber optic adapter, the method comprising:

providing a fiber optic connector comprising:

a connector housing defining a cable passage extending through opposing front and rear ends of the connector housing;

a latch comprising an elastic arm extending upwardly from a top surface of the connector housing in a rearward direction from the front end of the connector housing and a pressure rod extending in a rearward direction away from a rear side of the elastic arm; and a handle movably coupled to the connector housing, wherein the handle comprises a push arm, a cam, and a handle shaft, the pressure rod comprises a pushing surface disposed at a front side of the pressure rod, the push arm is laterally offset relative to the pressure rod of the latch, the cam is located at a lateral side of the push arm and configured to contact the pushing surface of the pressure rod, and the handle shaft extends backwardly in an opposite direction from the push arm and is configured to pull the handle backwards to engage the pressure rod;

retracting the handle shaft relative to the connector housing to force the cam against the pushing surface of the pressure rod and disengage the fiber optic connector from the fiber optic adapter; and removing the fiber optic connector from the fiber optic connector.

* * * * *